(12) United States Patent
Hsu (10) Patent No.: US 11,969,874 B2
(45) Date of Patent: Apr. 30, 2024

(54) TRANSMISSION DEVICE FOR LIFTING SICKBED

(71) Applicant: Pei-Yu Hsu, New Taipei (TW)

(72) Inventor: Pei-Yu Hsu, New Taipei (TW)

(73) Assignee: NANTONG SHUNLONG PHYSICAL THERAPY EQUIP. CO., LTD., Rugao (CN)

( * ) Notice: Subject to any disclaimer, the term of this patent is extended or adjusted under 35 U.S.C. 154(b) by 496 days.

(21) Appl. No.: 17/351,060

(22) Filed: Jun. 17, 2021

(65) Prior Publication Data

US 2022/0402111 A1 Dec. 22, 2022

(51) Int. Cl.
| | |
|---|---|
| *B25G 1/00* | (2006.01) |
| *A61G 7/012* | (2006.01) |
| *A61G 7/05* | (2006.01) |
| *B25G 1/10* | (2006.01) |
| *B66F 3/16* | (2006.01) |

(52) U.S. Cl.
CPC ............. *B25G 1/10* (2013.01); *A61G 7/012* (2013.01); *A61G 7/05* (2013.01); *B66F 3/16* (2013.01)

(58) Field of Classification Search
CPC ..... B60S 9/00; B60S 9/18; B60S 9/04; B25G 3/10; B25G 3/00; B25G 3/02
See application file for complete search history.

(56) References Cited

U.S. PATENT DOCUMENTS

| | | | | | |
|---|---|---|---|---|---|
| 2,649,281 | A | * | 8/1953 | Hastings, Jr. ............ | B66D 5/22 254/344 |
| 3,921,958 | A | * | 11/1975 | Brockelsby ............... | B60S 9/16 280/475 |
| 3,934,852 | A | * | 1/1976 | Weber ....................... | B60S 9/16 280/475 |
| 4,974,814 | A | * | 12/1990 | Cundy ................. | B66D 1/7484 74/462 |
| 5,863,028 | A | * | 1/1999 | Dunsmore ........... | B66D 1/7478 254/362 |
| 8,695,945 | B2 | * | 4/2014 | Guyard .................... | B66D 1/06 254/350 |
| 9,061,870 | B2 | * | 6/2015 | Fields .................. | B66D 1/7431 |
| 2010/0012908 | A1 | * | 1/2010 | Sjostedt .................. | G05G 1/12 464/182 |
| 2014/0246637 | A1 | * | 9/2014 | Anderson ................. | B60S 9/18 254/425 |
| 2015/0197413 | A1 | * | 7/2015 | Doig ........................ | B63C 3/02 248/124.2 |
| 2022/0169486 | A1 | * | 6/2022 | Evans ....................... | B60S 9/08 |

* cited by examiner

*Primary Examiner* — Lee D Wilson
(74) *Attorney, Agent, or Firm* — PAI PATENT & TRADEMARK LAW FIRM; Chao-Chang David Pai (57) ABSTRACT

A transmission device for lifting a sickbed contains a first casing, a second casing, a power input assembly, a power output assembly, and multiple screw elements. The first casing includes a first rotatable connection portion, a second rotatable connection portion, a first space, and multiple locking orifices. The second casing includes a third rotatable connection portion, a fourth rotatable connection portion, a second space, and multiple coupling orifices. The power input assembly includes an input shaft and a first bevel gear. The power output assembly includes an output shaft and a second bevel gear. The multiple screw elements are inserted through the multiple coupling orifices of the second casing to screw with the multiple locking orifices of the first casing.

9 Claims, 6 Drawing Sheets

TRANSMISSION DEVICE FOR LIFTING SICKBED

FIELD OF THE INVENTION

The present invention relates to a transmission mechanism, and more particularly to a transmission device for lifting a sickbed which is simplified and is fixed and maintained easily.

BACKGROUND OF THE INVENTION

A conventional transmission device of a sickbed is lifted and descended in a double-gear driving manner, and the conventional transmission device contains: a first casing and a second casing made of alloy, two driving shafts, two spur gears, and an operational lever.

The two spur gears are fixed on a drive shaft by using many components, such as ball bearings, washers, and bolts, thus having complicated structure and a large size to cause troublesome connection. Furthermore, a friction area of the components is increased to enhance driving resistance and to decrease support strength. Also, it is difficult to fix and remove the operational lever.

The present invention has arisen to mitigate and/or obviate the afore-described disadvantages.

SUMMARY OF THE INVENTION

The primary objective of the present invention is to provide a transmission device for lifting a sickbed which is simplified to reduce manufacture material and cost, and the transmission device is fixed and maintained easily, wherein the first casing and the second casing are made of engineering plastic to enhance reinforcement and a service life.

Further objective of the present invention is to provide a transmission device for lifting a sickbed which contains the power input assembly having the first bevel gear, and the power output assembly having a second bevel gear meshing with the first bevel gear, and the power input assembly and the power output assembly are accommodated in the first casing and the second casing to simplify a structure of the transmission device, to reduce fabrication cost, and to have easy maintenance.

Another objective of the present invention is to provide a transmission device for lifting a sickbed which contains the operational lever having the hexagonal shank inserted and removed easily, firmly, and stably to prolong a service life of the operational lever effectively.

To obtain the above objective, a transmission device for lifting a sickbed provided by the present invention contains: a first casing, a second casing, a power input assembly, a power output assembly, and multiple screw elements.

The first casing is made of engineering plastic, and the first casing includes a first rotatable connection portion extending along a first axial line, a second rotatable connection portion connected with the first rotatable connection portion and extending along a second axial line, a first space defined between the first rotatable connection portion and the second rotatable connection portion, and multiple locking orifices passing through the first rotatable connection portion and the second rotatable connection portion. The first axial line is perpendicular to the second axial line.

The second casing is made of engineering plastic, and the second casing includes a third rotatable connection portion extending along the first axial line, a fourth rotatable connection portion connected with the third rotatable connection portion and extending along the second axial line, a second space defined between the third rotatable connection portion and the fourth rotatable connection portion, and multiple coupling orifices passing through the third rotatable connection portion and the fourth rotatable connection portion. The first space of the first casing and the second space of the second casing are connected to form an accommodation chamber.

The power input assembly includes an input shaft rotatably accommodated in the first rotatable connection portion and the third rotatable connection portion, and the power input assembly includes a first bevel gear connected on the input shaft.

The power output assembly includes an output shaft rotatably received in the second rotatable connection portion and the fourth rotatable connection portion, and the power output assembly includes a second bevel gear connected on the output shaft and meshing with the first bevel gear. The first bevel gear and the second bevel gear are received in the accommodation chamber.

The multiple screw elements are inserted through the multiple coupling orifices of the second casing to screw with the multiple locking orifices of the first casing.

DETAILED DESCRIPTION OF THE PREFERRED EMBODIMENTS

Figure 1:
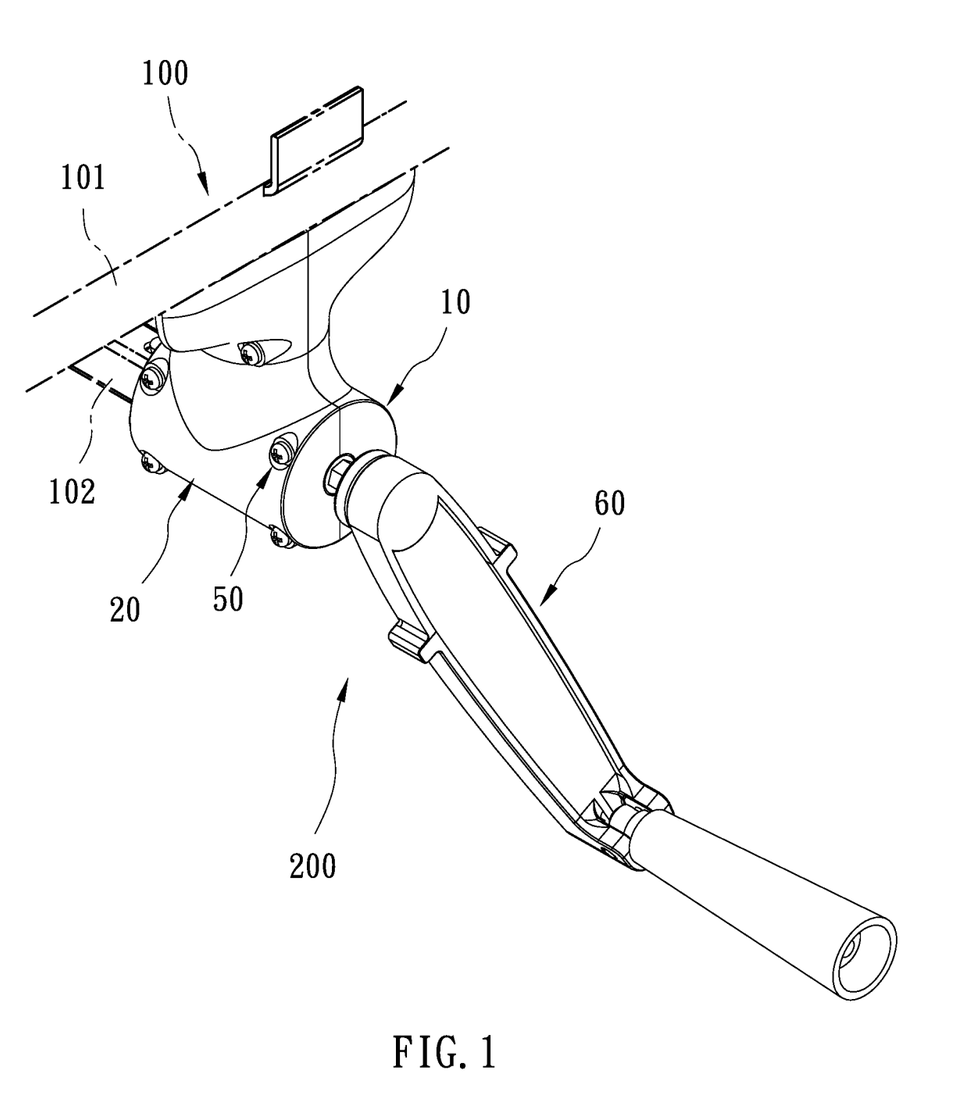
FIG. 1 is a perspective view showing the assembly of a transmission device for lifting a sickbed according to a preferred embodiment of the present invention.
Figure 2:
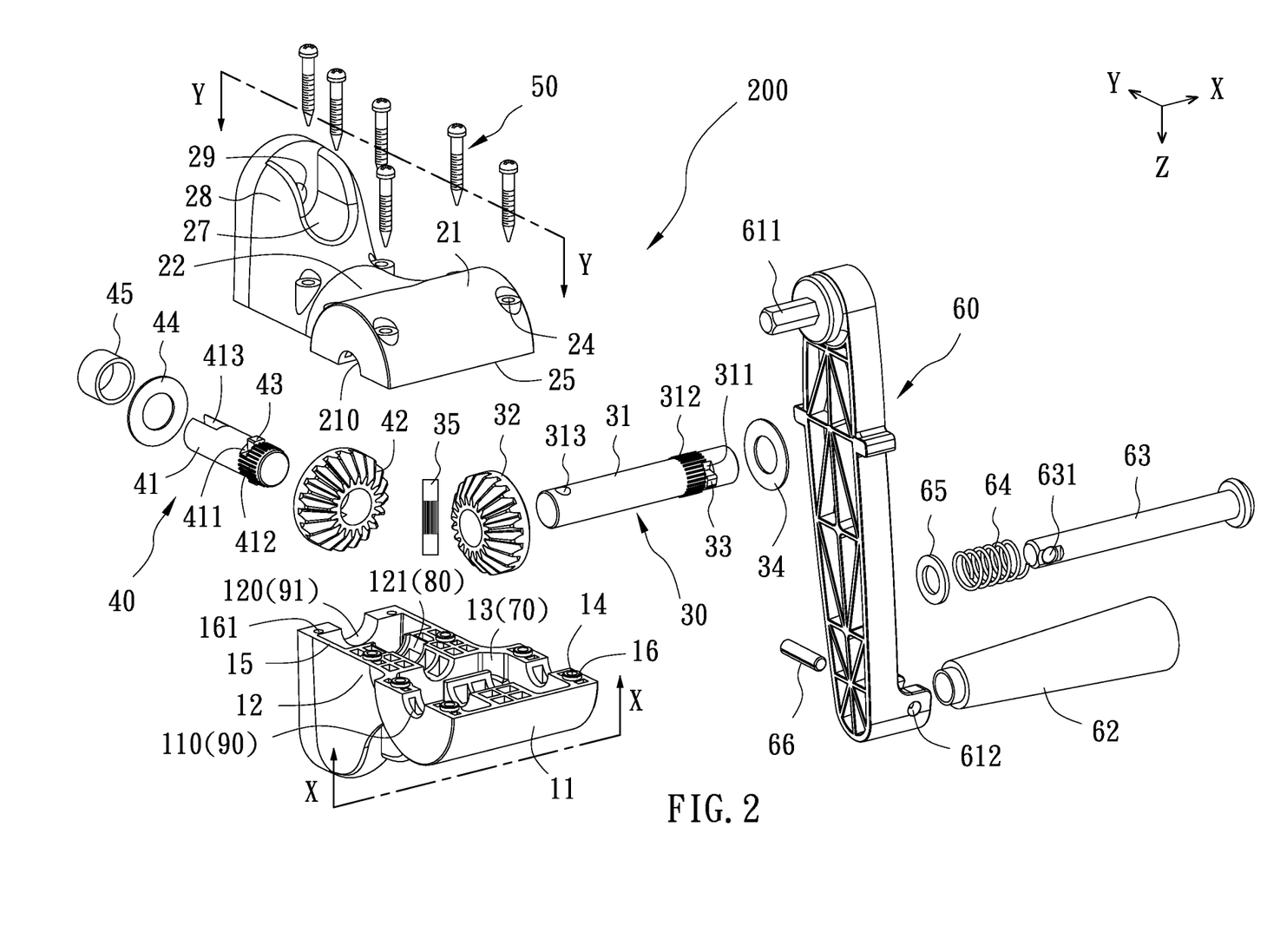
FIG. 2 is a perspective view showing the exploded components of the transmission device for lifting the sickbed according to the preferred embodiment of the present invention.

With reference to FIGS. 1 and 2, a transmission device for lifting a sickbed 100 according to a preferred embodiment of the present invention is fixed on a head mounting (not shown) or a bed end 101 so as to manually/automatically lift and descend the sickbed 100. The transmission device 200 comprises a first casing 10, a second casing 20, a power input assembly 30, a power output assembly 40, six screw elements 50, and an operational lever 60.

The first casing 10 is symmetrically arranged opposite to the second casing 20, and the first casing 10 and the second casing 20 are made of engineering plastic, wherein the engineering plastic consists of 70% polyamide (PA) and 30% glass fiber.

The first casing 10 includes a first rotatable connection portion 11 extending along a first axial line X, a second rotatable connection portion 12 connected with the first rotatable connection portion 11 and extending along a second axial line Y, a first space 13 defined between the first rotatable connection portion 11 and the second rotatable connection portion 12, and six locking orifices 14 defined on four corners of the first rotatable connection portion 11 and two sides of the second rotatable connection portion 12, wherein the first axial line X is perpendicular to the second axial line Y. The first rotatable connection portion 11 has a first arcuate groove 110 defined therein, and the second rotatable connection portion 12 has a first arc-shaped trough 120 orthogonal to the first arcuate groove 110.

Figure 3:
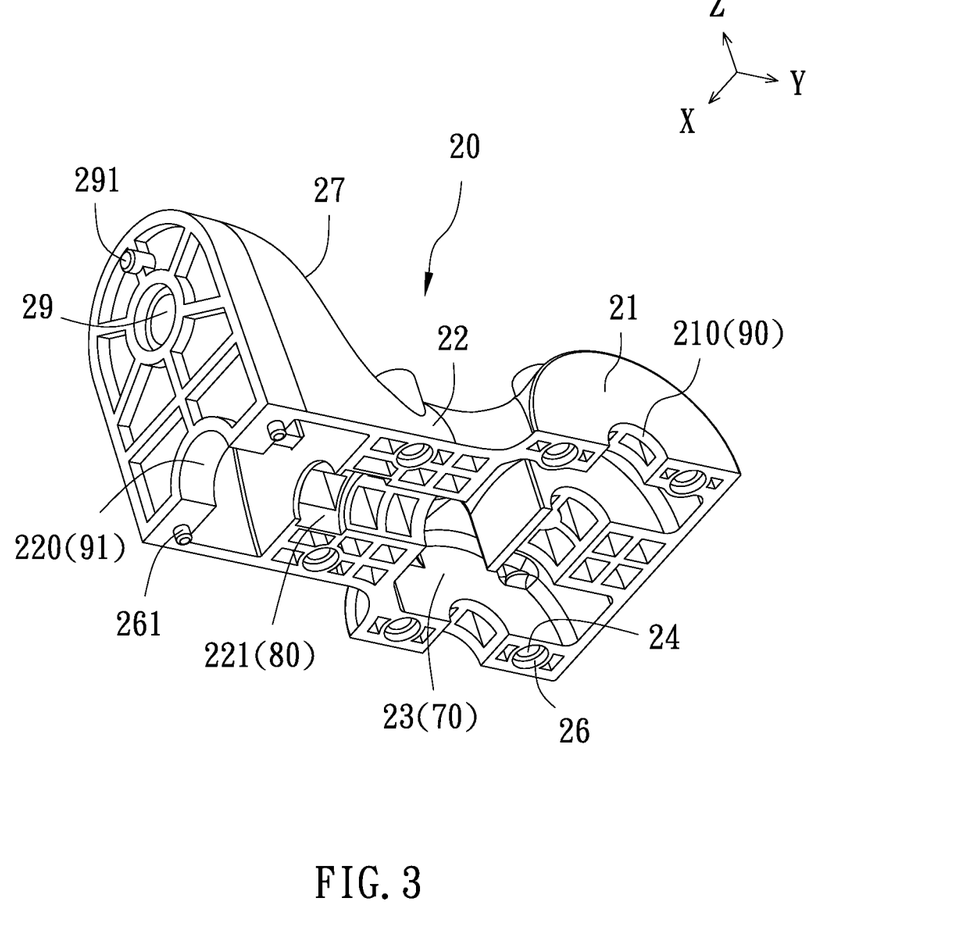
FIG. 3 is a perspective view showing the assembly of a part of the transmission device for lifting the sickbed according to the preferred embodiment of the present invention.
Figure 5:
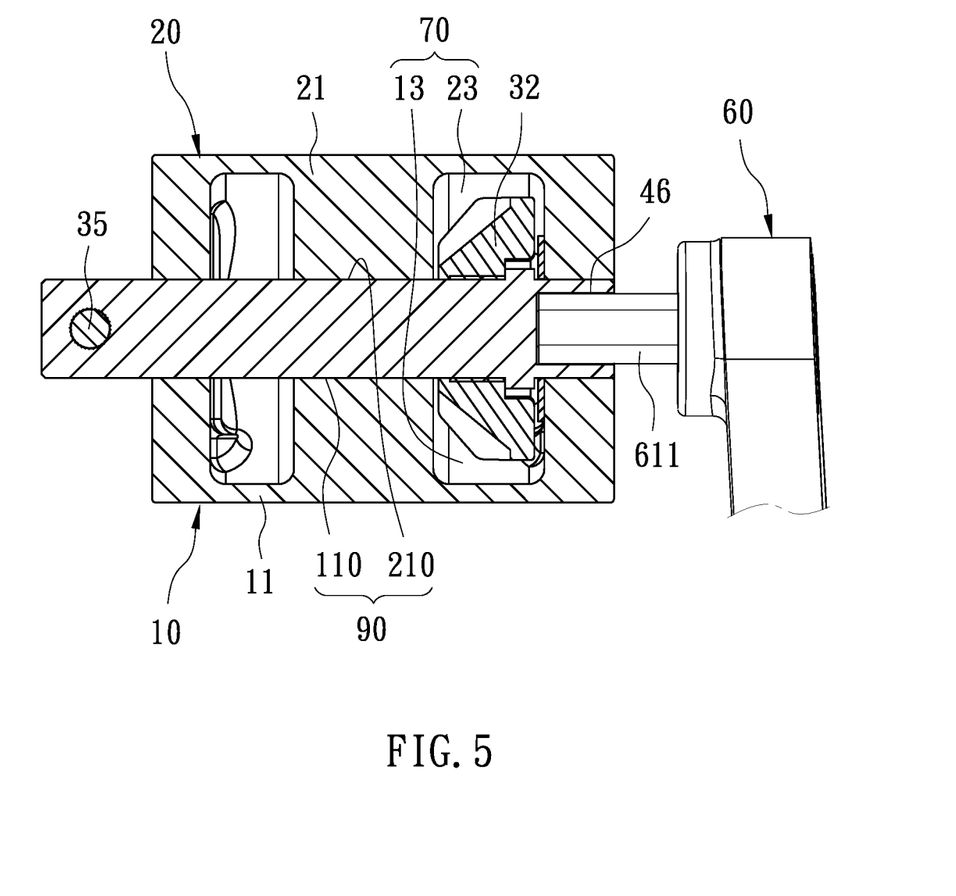
FIG. 5 is a cross sectional view taken along the line X-X of FIG. 2.

Referring to FIG. 3, the second casing 20 includes a third rotatable connection portion 21 extending along the first axial line X, a fourth rotatable connection portion 22 connected with the third rotatable connection portion 21 and extending along the second axial line Y, a second space 23 defined between the third rotatable connection portion 21 and the fourth rotatable connection portion 22, and six coupling orifices 24 defined on four corners of the third rotatable connection portion 21 and two sides of the fourth rotatable connection portion 22. The third rotatable connection portion 21 has a second arcuate groove 210 defined therein, and the fourth rotatable connection portion 22 has a second arc-shaped trough 220 orthogonal to the second arcuate groove 210, as shown in FIG. 5.

Figure 6:
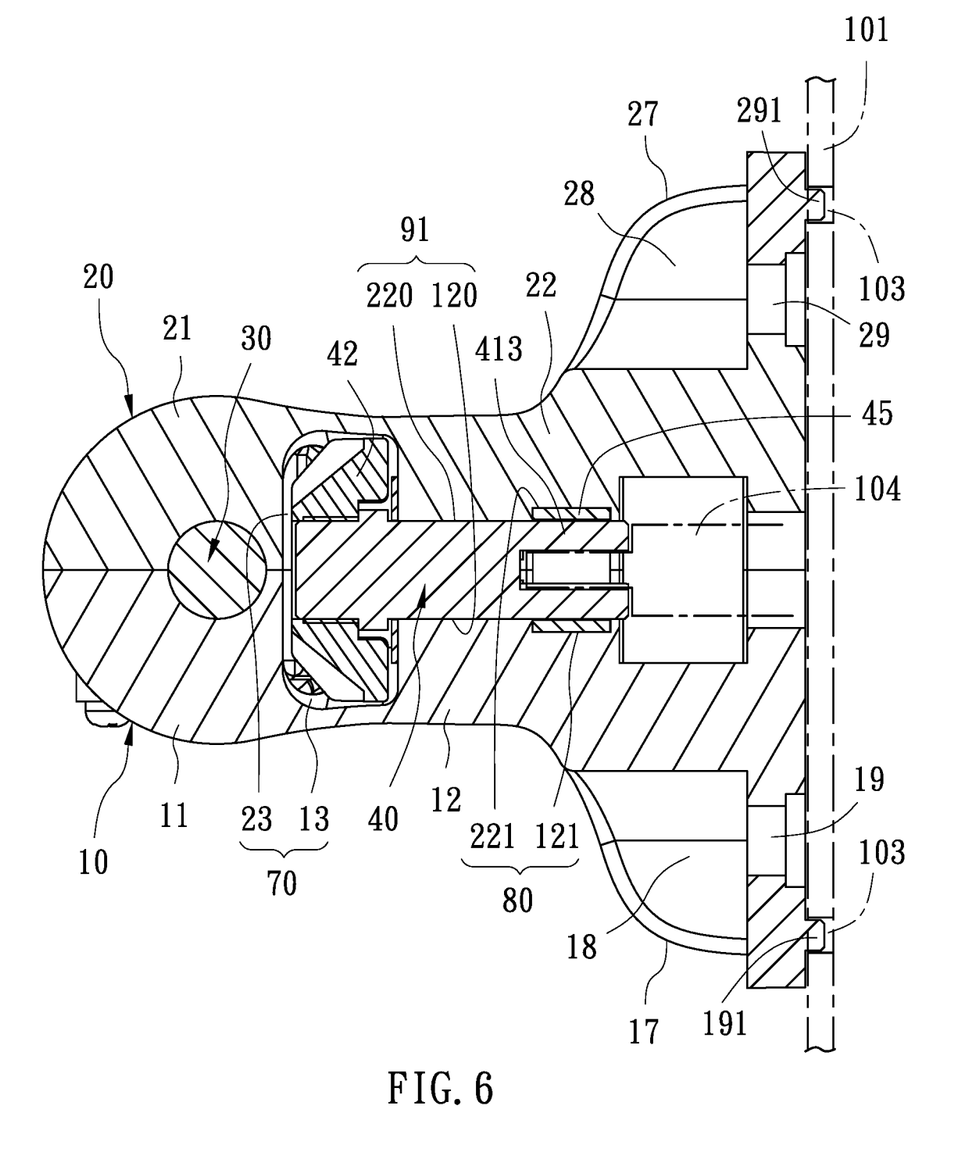
FIG. 6 is a cross sectional view taken along the line Y-Y of FIG. 2.

The first arcuate groove 110 is connected with the second arcuate groove 210 so as to form a first cavity 90, and the first arc-shaped trough 120 is connected with the second arc-shaped groove 220 so as to form a second cavity 91, as illustrated in FIG. 6.

The power input assembly 30 includes an input shaft 31 rotatably accommodated in the first cavity 90, a first bevel gear 32 connected on the input shaft 31, a flat key 33, a first washer 34, and a knurled pin 35. The input shaft 31 has a first key way 311 defined on a first end thereof, multiple first spaced ribs 312 formed beside the first key way 311, and a receiving orifice 313 formed on a second end of the input shaft 31, such that the first flat key 33 is received in the first key way 311 so as to connect with the first bevel gear 32, the first washer 34 is fitted on the input shaft 31 and is located beside the first bevel gear 32. The knurled pin 35 is accommodated in the receiving orifice 313 and is connected with a connection rod 102 of the sickbed 100 so as to fix the sickbed and to input or output the power.

The power output assembly 40 includes an output shaft 41 rotatably received in the second cavity 91, a second bevel gear 42 connected on the output shaft 41, a second flat key 43, a second washer 44, and a fitting ring 45.

Figure 4:
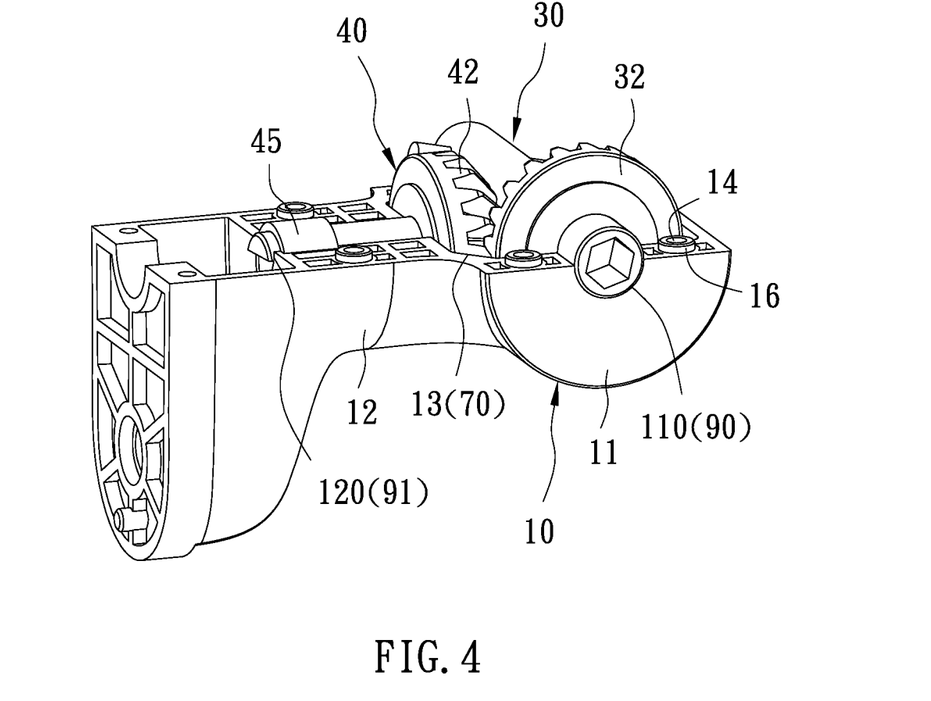
FIG. 4 is another perspective view showing the assembly of a part of the transmission device for lifting the sickbed according to the preferred embodiment of the present invention.

With reference to FIGS. 2-4, the first space 13 of the first casing 10 and the second space 23 of the second casing 20 are formed in an invert U shape and are connected to form an accommodation chamber 70, as shown in FIGS. 5 and 6, wherein the accommodation chamber 70 receives the first bevel gear 32 and the second bevel gear 42 which mesh with each other and are made in a metal power metallurgy manner, wherein a diameter of the first bevel gear 32 is equal to a diameter of the second bevel gear 42.

The output shaft 41 has a second key way 411 defined on a first end thereof, multiple second spaced ribs 412 arranged beside the second key way 411, and a fork portion 413 formed on a second end of the output shaft 41, such that the second flat key 43 is received in the second key way 411, and the second washer 44 is fitted on the output shaft 41 and is located beside the second bevel gear 42.

Referring to FIG. 6, when the first bevel gear 32 meshes with the second bevel gear 42, the first washer 34 and the second washer 44 are accommodated in the accommodation chamber 70 so that the first bevel gear 32 and the second bevel gear 42 are separated from an inner wall of the accommodation chamber 70, thus avoiding friction and damage.

Each of the six screw elements 50 is a self-tapping screw and is inserted through each of the six locking orifices 14 so as to screw with each of the six coupling orifices 24 of the second casing 20.

The first casing 10 and the second casing 20 are hollow and are connected to define a hollow portion therebetween, and the hollow portion of the first casing 10 and the second casing 20 has the multiple first spaced ribs intersecting with the multiple second spaced ribs. A ratio of a length of the input shaft 31 and a length of the output shaft 41 is 2:1, the first rotatable connection portion 11 is not symmetrical to the second rotatable connection portion 12, and the third rotatable connection portion 21 is not symmetrical to the fourth rotatable connection portion 22, such that a size of the first casing 10 and the second casing 20 is reduced to save fabrication cost and to obtain a simplified and compact structure.

Furthermore, as shown in FIGS. 1 and 3, the first casing 10 further includes a first connection face 15 horizontally formed on an inner wall thereof and multiple first fixing portions 16, 161 which are coaxial to the six locking orifices 14 and are arranged on the first connection face 15. The second casing 20 further includes a second connection face 25 horizontally formed on an inner wall thereof and multiple second fixing portions 26, 261 which are coaxial to the six coupling orifices 24 and are arranged on the second connection face 25. In this embodiment, each of the multiple first fixing portions 16 is a protrusion, each of the multiple second fixing portions 26 is an indentation and has a diameter more than a diameter of each coupling orifice 14, wherein each of the multiple first fixing portions 161 is a hole, and each of the multiple second fixing portions 261 is a column.

As illustrated in FIGS. 4-6, in assembly, the power input assembly 30 is received in the first arcuate groove 110 of the first casing 10, the power output assembly 40 is accommodated in the first arc-shaped trough 120 of the first casing 10, and the second casing 20 is covered on the first casing 10 so that the second arcuate groove 210 is engaged with the power input assembly 30, and the second arc-shaped groove 220 is engaged with the power output assembly 40, such that the multiple first fixing portions 16, 161 are engaged with the multiple second fixing portions 26, 261, as shown in FIGS. 2 and 3, thus obtaining a connection of the first casing 10, the second casing 20, the power input assembly 30, and the power output assembly 40. Thereafter, the six screw elements 50 screw the first casing and the second casing.

With reference to FIGS. 2 and 6, the first casing 10 further includes a first arcuate tab 17 formed on a side of the second rotatable connection portion 12 and extending from a third axial line Z, a first semicircle trench 18 defined on the first arcuate tab 17, a first aperture 19 parallel to the second axial line Y and passing through the first arcuate tab 17, and a first stem 191 extending from the first arcuate tab 17, wherein the third axial line Z is orthogonal to the second axial line Y. The second casing 20 further includes a second arcuate tab 27 formed on a side of the fourth rotatable connection portion 22, a second trench 28 defined on the second arcuate tab 27, a second aperture 29 parallel to the third axial line Z and passing through the second arcuate tab 28, and a second stem 291 extending from the second arcuate tab 27.

As desiring to fix the transmission device on the bed end 101 (or a headboard 110) of the sickbed 100, the first stem 191 of the first casing 10 and the second stem 291 of the second casing 20 are aligned with a defining orifice 103 of the bed end 101, and the six screw elements 50 are screwed with the headboard 110 via the first aperture 19, the second aperture 29, and the defining orifice 103, thus fixing and maintaining the transmission device easily. Preferably, the first casing 10 and the second casing 20 are not sharp to avoid injuring a user's hands, and the first stem 191 and the second stem 291 are a solid column and have a rectangular cross section so as to fix the bed end 101 securely and easily.

The first casing 10 further includes a first recess 121 defined on a middle section of the second rotatable connection portion 12, and the second casing 20 further includes a second recess 221 defined on a middle section of the fourth rotatable connection portion 22, wherein a receiving room 80 is defined by the first recess 121 and the second recess 221. In assembly, the fitting ring 45 is fitted on the fork portion 413 of the output shaft 41 and is accommodated in the receiving room 80. When a driving rod assembly 104 is driven to extend into and connect with the fork portion 413 of the output shaft 41, the driving rod assembly 104 is defined by the fitting ring 45 to avoid a vibration of the sickbed, and the fitting ring 45 does not contact with the output shaft 41, thus preventing abrasion. In addition, the fitting ring 45 is made of Q195 carbon steel to obtain a brilliant rigidity.

The operational lever 60 includes a body 61 and a hollow extension 62 rotatably connected on the body 61, and the body 61 has a hexagonal shank 611 extending from a first end thereof and a rotatable joining portion 612 formed on a second end of the body 61. The hexagonal shank 611 has six arc-shaped depressions, each of which is formed on each of six sides of the hexagonal shank 611, and the input shaft 41 has a hexagonal dead hole 46 defined on an edge thereof. When lifting or descending the sickbed manually, the hexagonal shank 611 of the operational lever 60 is inserted into the hexagonal dead hole 46, as shown in FIG. 5, thus driving the sickbed manually. The operational lever 60 further includes a central pillar 63, a resilient element 64, a buffer loop 65, and a bolt 66. The central pillar 63 has a through hole 631 defined on an end thereof, and the buffer loop 65, the resilient element 64, and the central pillar 63 are inserted into the hollow extension 62, wherein the bolt 66 is rotatably received in the through hole 631 of the central pillar 63 and the rotatable joining portion 612 of the body 61, such that the resilient element 64 urges the hollow extension 62 to retract to the body 61. Alternatively, the hollow extension 62 is pulled away from the body 61 to stay in a using state, as shown in FIG. 1. Due to the hexagonal shank 611 of the operational lever 60 is inserted into the hexagonal dead hole 46 of the input shaft 40, the hexagonal shank is inserted and removed easily, firmly, and stably to prolong a service life of the operational lever 60 effectively.

Accordingly, the transmission device for lifting the sickbed is simplified and compact to reduce manufacture material and cost. Preferably, the transmission device is fixed and maintained easily, and the first casing and the second casing are made of engineering plastic to enhance reinforcement and the service life. Preferably, the first casing and the second casing are not sharp to avoid injuring the user's hands.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A transmission device for lifting a sickbed comprising:
a first casing made of 70% polyamide (PA) and 30% glass fiber, and the first casing including a first rotatable connection portion extending along a first axial line, a second rotatable connection portion connected with the first rotatable connection portion and extending along a second axial line, a first space defined between the first rotatable connection portion and the second rotatable connection portion, and multiple locking orifices passing through the first rotatable connection portion and the second rotatable connection portion, the first axial line being perpendicular to the second axial line;
a second casing made of 70% polyamide (PA) and 30% glass fiber, and the second casing including a third rotatable connection portion extending along the first axial line, a fourth rotatable connection portion connected with the third rotatable connection portion and extending along the second axial line, a second space defined between the third rotatable connection portion and the fourth rotatable connection portion, and multiple coupling orifices passing through the third rotatable connection portion and the fourth rotatable connection portion, the first space of the first casing and the second space of the second casing being connected to form an accommodation chamber;
a power input assembly including an input shaft rotatably accommodated in the first rotatable connection portion and the third rotatable connection portion, and the power input assembly including a first bevel gear connected on the input shaft;
a power output assembly including an output shaft rotatably received in the second rotatable connection portion and the fourth rotatable connection portion, and the power output assembly including a second bevel gear connected on the output shaft and meshing with the first bevel gear, the first bevel gear and the second bevel gear being received in the accommodation chamber; and
multiple screw elements inserted through the multiple coupling orifices of the second casing to screw with the multiple locking orifices of the first casing.

2. The transmission device as claimed in claim 1, wherein the power input assembly includes a flat key, a first washer, and a knurled pin, wherein the input shaft has a first key way defined on a first end thereof, multiple first spaced ribs formed beside the first key way, and a receiving orifice formed on a second end of the input shaft, such that the first flat key is received in the first key way, the first washer is fitted on the input shaft and is located beside the first bevel gear, and the knurled pin is accommodated in the receiving orifice.

3. The transmission device as claimed in claim 1, wherein the power output assembly includes a second flat key and a second washer, the output shaft has a second key way defined on a first end thereof, and the output shaft has multiple second spaced ribs arranged beside the second key way, such that the second flat key is received in the second key way, and the second washer is fitted on the output shaft and is located beside the second bevel gear.

4. The transmission device as claimed in claim 1, wherein the power output assembly further includes a fitting ring, and the first casing further includes a first recess defined on a middle section of the second rotatable connection portion, the second casing further includes a second recess defined on a middle section of the fourth rotatable connection portion, wherein a receiving room is defined by the first recess and the second recess, and a fork portion is formed on a second end of the output shaft, such that the fitting ring is fitted on the fork portion of the output shaft and is accommodated in the receiving room.

5. The transmission device as claimed in claim 1, wherein the first casing further includes a first connection face formed on an inner wall thereof and multiple first fixing portions which are coaxial to the multiple locking orifices and are arranged on the first connection face, the second casing further includes a second connection face formed on an inner wall thereof and multiple second fixing portions which are coaxial to the multiple coupling orifices and are arranged on the second connection face, wherein the multiple first fixing portions are engaged with the multiple second fixing portions.

6. The transmission device as claimed in claim 1, wherein the first casing and the second casing are hollow and are connected to define a hollow portion therebetween, and a ratio of a length of the input shaft and a length of the output shaft is 2:1, wherein the first rotatable connection portion is not symmetrical to the second rotatable connection portion, and the third rotatable connection portion is not symmetrical to the fourth rotatable connection portion.

7. The transmission device as claimed in claim 1, wherein the first casing further includes a first arcuate tab formed on a side of the second rotatable connection portion and extending from a third axial line, a first semicircle trench defined on the first arcuate tab, a first aperture parallel to the second axial line and passing through the first arcuate tab, and a first stem extending from the first arcuate tab, wherein the third axial line is orthogonal to the second axial line; the second casing further includes a second arcuate tab formed on a side of the fourth rotatable connection portion, a second trench defined on the second arcuate tab, a second aperture parallel to the third axial line and passing through the second arcuate tab, and a second stem extending from the second arcuate tab.

8. The transmission device as claimed in claim 1 further comprising an operational lever which includes a body and a hollow extension rotatably connected on the body, wherein the body has a hexagonal shank extending from a first end thereof, and the input shaft has a hexagonal dead hole defined on an edge thereof.

9. The transmission device as claimed in claim 8, wherein the operational lever further includes a central pillar, a resilient element, a buffer loop, and a bolt, wherein the central pillar has a through hole defined on an end thereof, and the buffer loop, the resilient element and the central pillar are inserted into the hollow extension, wherein the bolt is rotatably received in the through hole of the central pillar and the rotatable joining portion of the body.

\* \* \* \* \*